United States Patent
Wang

(10) Patent No.: US 7,987,560 B2
(45) Date of Patent: Aug. 2, 2011

(54) HINGE ASSEMBLY

(75) Inventor: Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 347 days.

(21) Appl. No.: 12/417,813

(22) Filed: Apr. 3, 2009

(65) Prior Publication Data

US 2010/0102191 A1     Apr. 29, 2010

(51) Int. Cl.
  *E05D 3/10* (2006.01)
  *E05D 11/08* (2006.01)
(52) U.S. Cl. ............... 16/367; 16/330; 16/337; 16/340
(58) Field of Classification Search ............ 16/367, 16/386, 338–340, 330, 303, 380, 334; 361/679.06, 361/679.27, 679.28, 679.11, 679.12, 679.13; 379/433.12, 433.13; 455/575.1, 575.4, 575.8, 455/550.1, 90.3; 348/373, 333.06, 794; 248/291.1, 248/292.12, 292.13, 919–923
See application file for complete search history.

(56) References Cited

U.S. PATENT DOCUMENTS

| | | | |
|---|---|---|---|
| 7,845,051 B2 * | 12/2010 | Saito et al. | 16/337 |
| 2003/0097732 A1 * | 5/2003 | Kim | 16/337 |
| 2004/0084578 A1 * | 5/2004 | Cho et al. | 248/125.1 |
| 2005/0166365 A1 * | 8/2005 | Hsieh | 16/337 |
| 2006/0191104 A1 * | 8/2006 | Cho et al. | 16/340 |
| 2007/0119024 A1 * | 5/2007 | Kim | 16/337 |
| 2007/0136995 A1 * | 6/2007 | Hu et al. | 16/340 |
| 2008/0034551 A1 * | 2/2008 | Jeong | 16/367 |
| 2009/0121094 A1 * | 5/2009 | Chang et al. | 248/125.7 |

FOREIGN PATENT DOCUMENTS

| | | | |
|---|---|---|---|
| GB | 2279105 A | * | 12/1994 |
| JP | 2002266841 A | * | 9/2002 |
| JP | 2005208428 A | * | 8/2005 |

* cited by examiner

*Primary Examiner* — Chuck Y. Mah
(74) *Attorney, Agent, or Firm* — Clifford O. Chi

(57) ABSTRACT

A hinge assembly includes a pivot shaft, a first supporting member, a second supporting member, a first positioning piece, and a second positioning piece. The first supporting member and the second supporting member are sleeved on the pivot shaft. One of the first supporting member and the second supporting member is non-rotatably connected to the pivot shaft. The first positioning piece and the second positioning piece are sleeved on the pivot shaft, and adjacent to each other. The first positioning piece defines a plurality of positioning protrusions. The second positioning piece defines a plurality of positioning holes for receiving the positioning protrusions. The second positioning piece is elastic. When the first supporting member rotates relative to second supporting member, the second positioning piece deforms.

19 Claims, 7 Drawing Sheets

HINGE ASSEMBLY

BACKGROUND

1. Technical Field

The present disclosure relates generally to hinge assemblies and, more particularly, to a hinge assembly for a liquid crystal display device.

2. Description of Related Art

Liquid crystal display (LCD) devices are gradually replacing conventional cathode ray tube (CRT) devices because LCD devices have excellent display quality and are thinner and lighter than CRT devices. A tilt angle of a LCD panel of the LCD device can be adjusted via a typical hinge.

The typical hinge includes a shaft, a first stand, a second stand, a cam, a cam follower, a plurality of flat washers, and a screw. The shaft extends through the first stand, the cam, the cam follower, a second stand, a plurality of flat washers, and engages with the screw. The cam defines a plurality of peaks, and the cam follower defines a plurality of valleys corresponding to the peaks of the cam. The cam is fixed to the first stand, and the cam follower is fixed to the second stand. The first stand is connected to the LCD panel. The cam can rotate together with the first stand, so that the peaks of the cam engage in the valleys of the cam follower. Therefore, the LCD panel can be positioned.

However, the valleys of the cam follower are difficult to machine because the valleys need an appropriate depth corresponding to the peaks of the cam. Furthermore, the cam follower is delicate, so it can be easily broken in a punching process.

Therefore, a hinge assembly which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
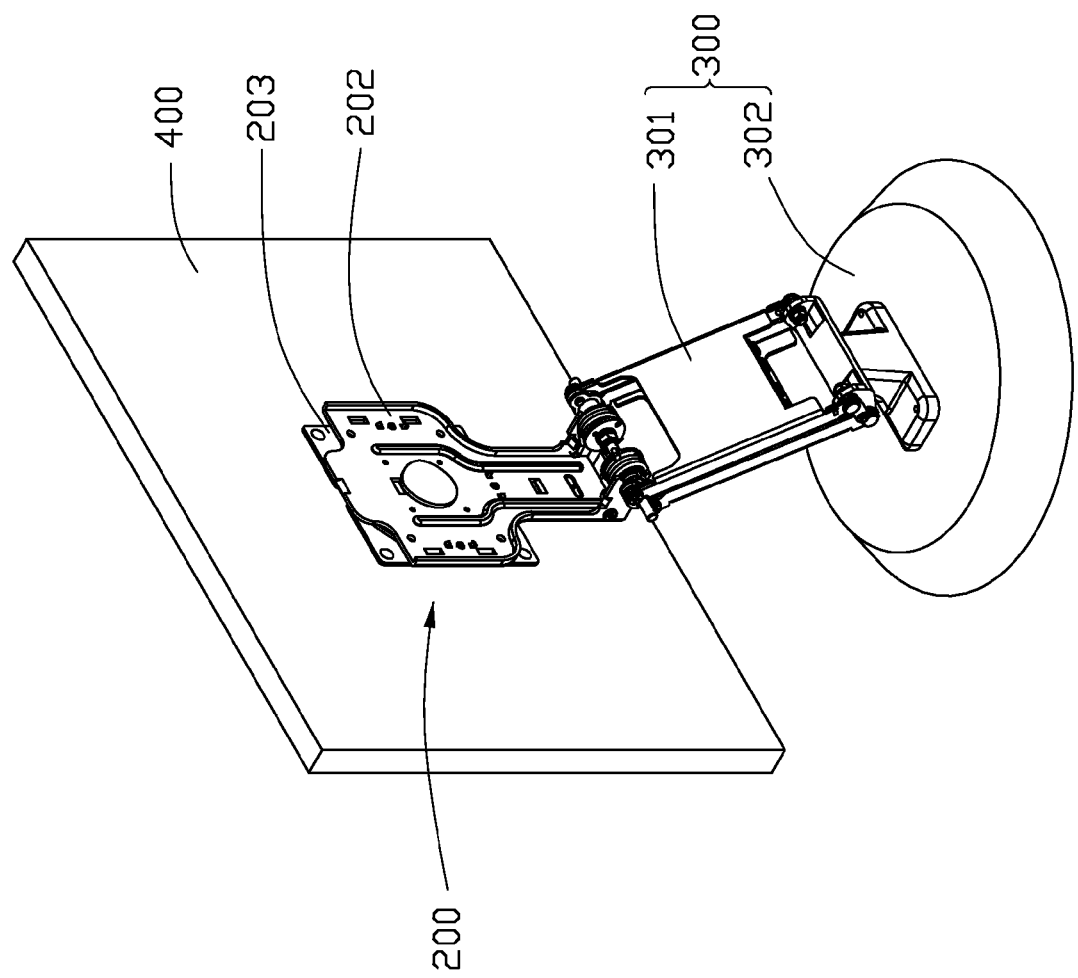
FIG. 1 is an assembled, isometric view of a first embodiment of a hinge assembly applied in an LCD device.

Referring to FIG. 1, a first embodiment of a hinge assembly 200 applied in an LCD device (not labeled) is shown. The LCD device includes the hinge assembly 200, a stand 300, and an LCD panel 400. The stand 300 includes a supporting frame 301 and a base 302. The supporting frame 301 is rotatably connected to the base 302. The LCD panel 400 is connected to the stand 300 via the hinge assembly 200, and is rotatable in a plane of the LCD panel 400.

Figure 2:
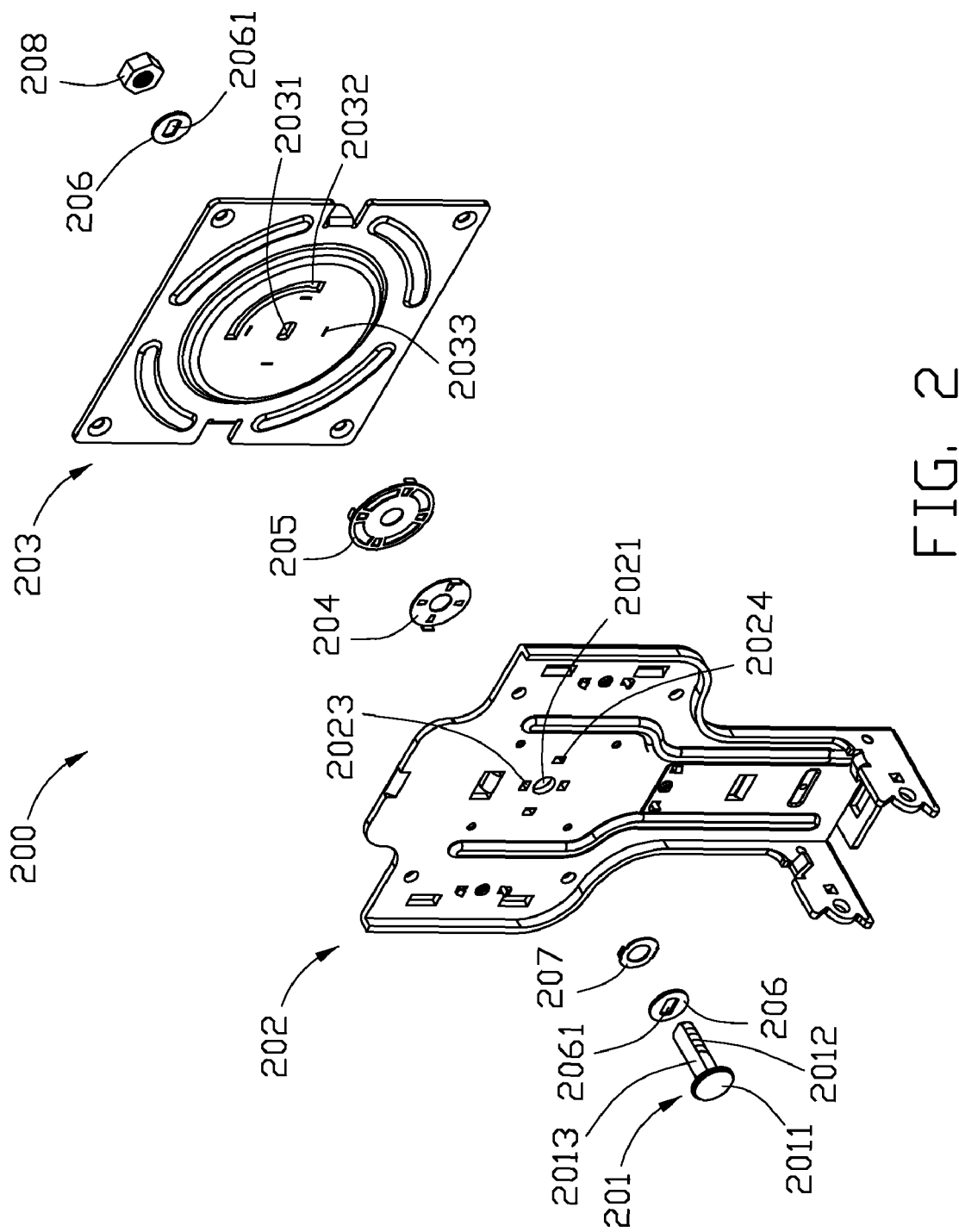
FIG. 2 is an exploded, isometric view of the hinge assembly of FIG. 1, the hinge assembly including a pivot shaft, a first supporting member, a second supporting member, a first positioning piece, a second positioning piece, and a fastening member.
Figure 3:
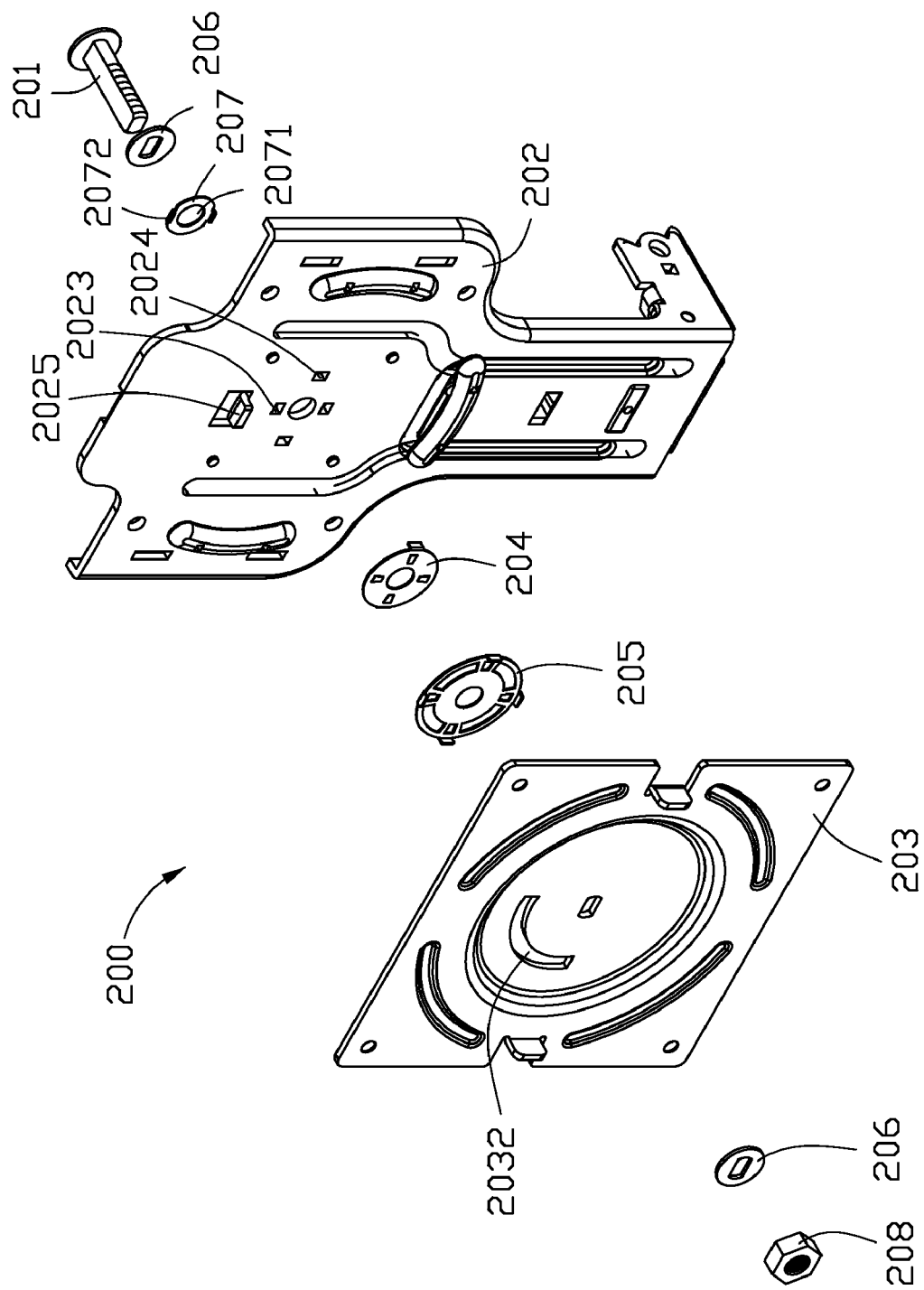
FIG. 3 is an exploded, isometric view of the hinge assembly of FIG. 1, but viewed from another aspect.

Referring to FIGS. 2 and 3, the hinge assembly 200 includes a pivot shaft 201, a first supporting member 202, a second supporting member 203, a first positioning piece 204, a second positioning piece 205, a flat washer 206, a friction member 207, and a fastening member 208. The first supporting member 202 is rotatably connected to the supporting frame 301, and the second supporting member 203 is fixed to the LCD panel 400.

The pivot shaft 201 defines two positioning planes 2013 opposite to each other. A flange 2011 is formed on an end of the pivot shaft 201, and a threaded portion 2012 is formed on the other end of the pivot shaft 201.

The first supporting member 202 defines a circular pivot hole 2021 in a center portion thereof. The first supporting member 202 further defines two first fixing holes 2023 and two second fixing holes 2024 around the pivot hole 2021. The first fixing holes 2023 are opposite to each other. The second fixing holes 2024 are opposite to each other. A restricting protrusion 2025 is formed on the first supporting member 202 adjacent to the pivot hole 2021.

The second supporting member 203 defines a shaft hole 2031 corresponding to the pivot shaft 201, and an arched restricting groove 2032 adjacent to the shaft hole 2031. The restricting groove 2032 is configured for slidably receiving the restricting protrusion 2025 of the first supporting member 202. The second supporting member 203 further defines four assembling grooves 2033 around the shaft hole 2031.

Figure 4:
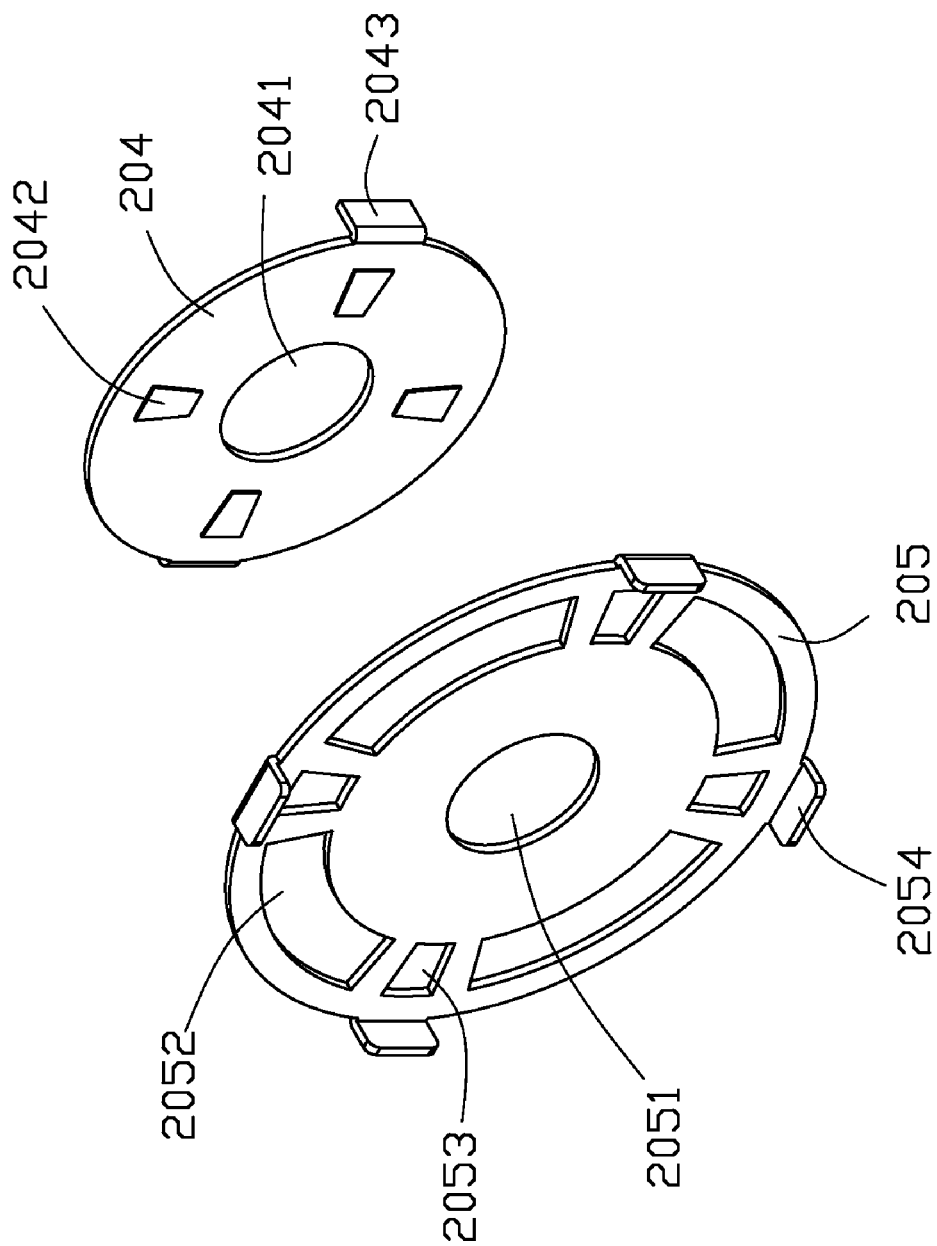
FIG. 4 is an isometric view of the first positioning piece and the second positioning piece.
Figure 5:
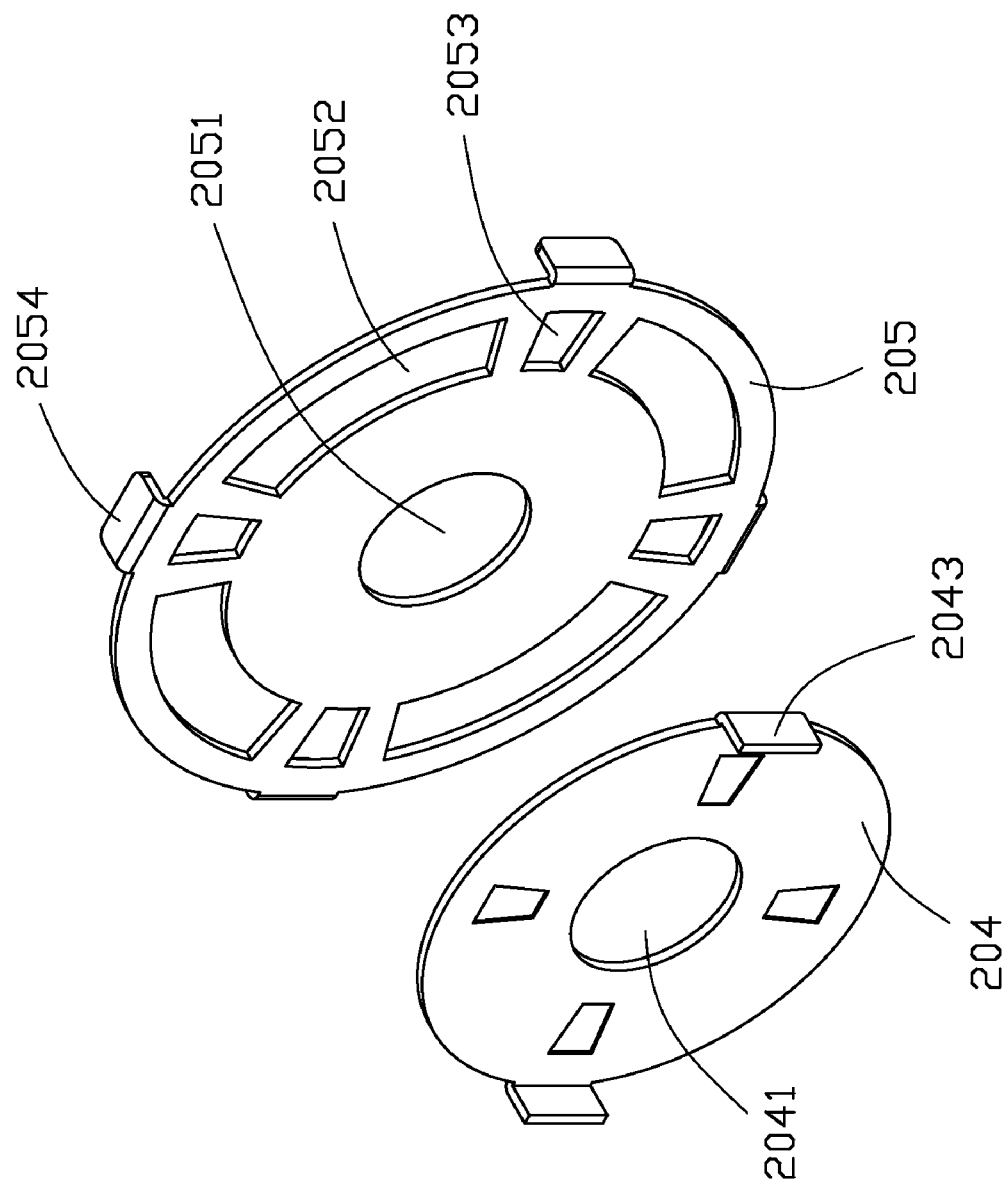
FIG. 5 is similar to FIG. 4, but viewed from another aspect.

Referring to FIGS. 4 and 5, the first positioning piece 204 defines a connecting hole 2041 in a center portion thereof. Four positioning protrusions 2042 are formed on the first positioning piece 204, and arranged in a circular manner. Two connecting portions 2043 are formed on the first positioning piece 204, and configured for engaging in the second fixing holes 2024 of the first supporting member 202.

The second positioning piece 205 is elastic, and defines a connecting hole 2051 in a center portion thereof. The second positioning piece 205 further defines four positioning holes 2053 and four sliding grooves 2052 around the connecting hole 2051 in a circular alternating manner. Two connecting portions 2054 are formed on the second positioning piece 205, and configured for engaging in the assembling grooves 2033 of the second supporting member 203. The positioning holes 2053 of the second positioning piece 205 may be made by punching.

Each flat washer 206 defines an assembling hole 2061 in a center portion thereof having a shape corresponding to the shape of the cross-section of the pivot shaft 201. The friction member 207 defines a through hole 2071 in a center portion thereof. Two assembling portions 2072 extend from opposite sides of the friction member 207. The assembling portions 2072 are configured for engaging in the first fixing hole 2023 of the first supporting member 202. In the illustrated embodiment, the fastening member 208 is a nut.

Figure 6:
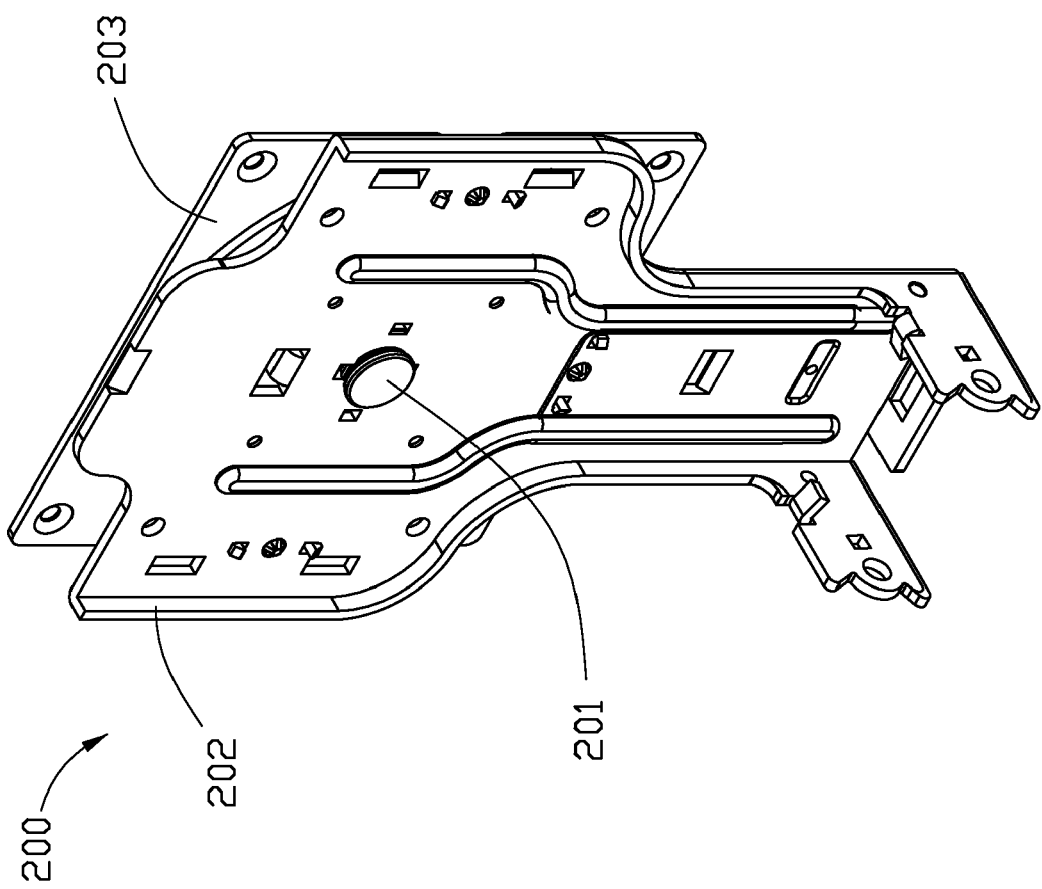
FIG. 6 is an assembled, isometric view of the hinge assembly of FIG. 1.

Referring to FIG. 6, in assembling the hinge assembly 200, the pivot shaft 201 extends through one flat washer 206, the friction member 207, the pivot hole 2021 of the first supporting member 202, the connecting hole 2041 of the first positioning piece 204, the connecting hole 2051 of the second positioning piece 205, the shaft hole 2031 of the second supporting member 203, and engages with the fastening member 208. The connecting portions 2043 of the first positioning piece 204 are engaged in the second fixing holes 2024 of the first supporting member 202. The connecting portions 2054 of the second positioning piece 205 are engaged in the assembling grooves 2033 of the second supporting member 203. Assembling portions 2072 of the friction member 207 are engaged in the first fixing holes 2023 of the first supporting member 202. The first supporting member 202 is rotatably sleeved on the pivot shaft 201, and the second supporting member 203 is non-rotatably sleeved on the pivot shaft 201. The positioning protrusions 2042 of the first positioning piece 204 are engaged in the positioning holes 2053 of the second positioning piece 205. After the hinge assembly 200 is assembled, the LCD panel 400 is fixed to the second supporting member 203.

When the LCD panel 400 is rotated in a clockwise direction, the restricting protrusion 2025 slides in the restricting groove 2032 of the second supporting member 203. Since the second positioning piece 205 is elastic, the second positioning piece 205 deforms, and the positioning protrusions 2042 of the first positioning piece 204 disengage from the positioning holes 2053 of the second positioning piece 205 when the LCD panel 400 is rotated. When the LCD panel 400 is further rotated in the clockwise direction, the positioning protrusions 2042 of the first positioning piece 204 slide in the sliding grooves 2052. After the LCD panel 400 is rotated through a predetermined angle, the positioning protrusions 2042 of the first positioning piece 204 are engaged in the positioning holes 2053 of the second positioning piece 205, thereby positioning the LCD panel 400 again. When the restricting protrusion 2025 slides to an end of the restricting groove 2032, the LCD panel 400 cannot be rotated in the clockwise direction any further. In the illustrated embodiment, the LCD panel 400 can be rotated in the clockwise direction for about 90 degrees.

It may be appreciated that the fastening member 208 may be a riveting piece, and the riveting piece is riveted on an end of the pivot shaft 201. In addition, the restricting protrusion 2025 may be formed on the second supporting member 203, and the arched restricting groove 2032 is defined in the first supporting member 202.

Figure 7:
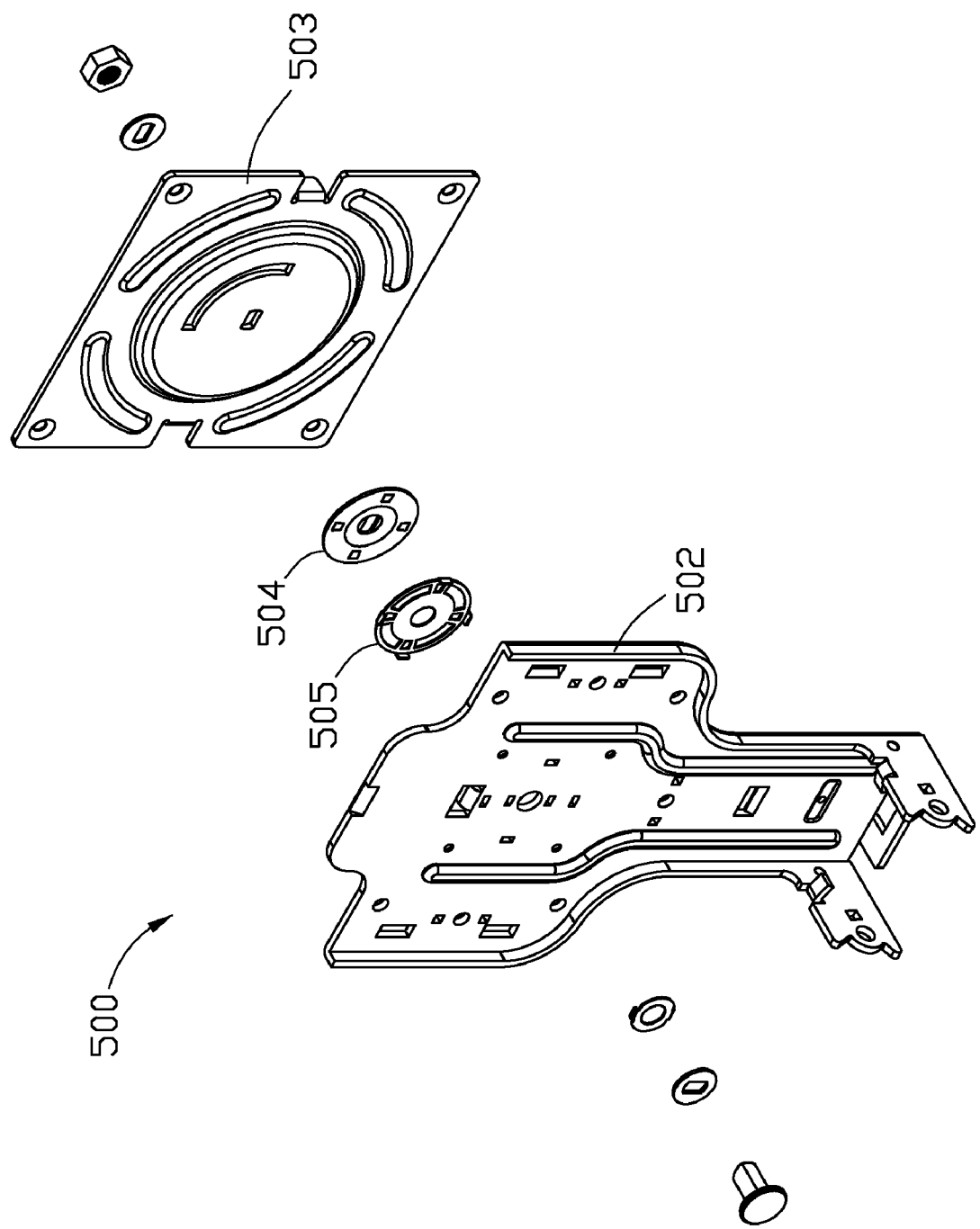
FIG. 7 is an exploded, isometric view of a second embodiment of a hinge assembly.

Referring to FIG. 7, a second embodiment of a hinge assembly 500 is similar to the first embodiment of the hinge assembly 200, except that the first positioning piece 504 is fixed to the second supporting member 503, and the second positioning piece 505 is fixed to the first supporting member 502.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A hinge assembly, comprising:
a pivot shaft;
a first supporting member adapted to be mounted to a first hinged member, a second supporting member sleeved on the pivot shaft and adapted to be mounted to a second hinged member, wherein one of the first supporting member and the second supporting member is non-rotatably connected to the pivot shaft; and
a first positioning piece and a second positioning piece sleeved on the pivot shaft, and adjacent to each other, wherein one of the first positioning piece and the second positioning piece is non-rotatably connected to the first supporting member, and the other one of the first positioning piece and the second positioning piece is non-rotatably connected to the second supporting member;
wherein the first positioning piece defines at least one positioning protrusion, and the second positioning piece defines at least one positioning hole for receiving the at least one positioning protrusion; the second positioning piece is elastic, such that when the first supporting member rotates relative to the second supporting member, the second positioning piece deforms, and the at least one positioning protrusion is capable of disengaging from the at least one positioning hole of the second positioning piece.

2. The hinge assembly of claim 1, wherein the second positioning piece defines a sliding groove between two adjacent positioning holes.

3. The hinge assembly of claim 1, wherein the at least one positioning hole of the second positioning piece is made by punching.

4. The hinge assembly of claim 1, wherein a restricting protrusion is formed on the first supporting member; an arched restricting groove is defined in the second supporting member; the restricting protrusion is slidably received in the arched restricting groove.

5. The hinge assembly of claim 1, wherein the hinge assembly further comprises a friction member sleeved on the pivot shaft, and fixed to the first supporting member.

6. The hinge assembly of claim 1, wherein the hinge assembly further comprises a fastening member engaging with an end of the pivot shaft.

7. The hinge assembly of claim 6, wherein a threaded portion is formed on an end of the pivot shaft; the fastening member is a nut engaging with the threaded portion of the pivot shaft.

8. The hinge assembly of claim 6, wherein the hinge assembly further comprises a flat washer sleeved on the pivot shaft, and positioned between the fastening member and the second supporting member.

9. The hinge assembly of claim 1, wherein at least one connecting portion is formed on the first positioning piece; the first supporting member defines at least one fixing hole; the at least one connecting portion engages in the at least one fixing hole of the first supporting member.

10. The hinge assembly of claim 9, wherein at least one connecting portion is formed on the second positioning piece; the second supporting member defines at least one assembling groove; the at least one connecting portion engages in the at least one assembling groove of the second supporting member.

11. An LCD device, comprising:
a stand;
an LCD panel;
a hinge assembly connecting the LCD panel to the stand, the hinge assembly comprising:
a pivot shaft;
a first supporting member and a second supporting member sleeved on the pivot shaft, wherein one of the first supporting member and the second supporting member is non-rotatably connected to the pivot shaft, the first supporting member is rotatably connected to the stand, and the second supporting member is connected to the LCD panel; and
a first positioning piece and a second positioning piece sleeved on the pivot shaft, and adjacent to each other, wherein one of the first positioning piece and the second positioning piece is non-rotatably connected to the first supporting member, and the other one of the first positioning piece and the second positioning piece is non-rotatably connected to the second supporting member;
wherein the first positioning piece defines at least one positioning protrusion, the second positioning piece defines at least one positioning hole for receiving the at least one positioning protrusion; the second positioning piece is elastic, such that when the first supporting member rotates relative to the second supporting member, the second positioning piece deforms, and the at least one positioning protrusion is capable of disengaging from the at least one positioning hole of the second positioning piece.

12. The hinge assembly of claim 11, wherein the stand comprises a base and a supporting frame rotatably connected to the base; the first supporting member is rotatably connected to the supporting frame.

13. The hinge assembly of claim 11, wherein the second positioning piece defines a sliding groove between two adjacent positioning holes.

14. The hinge assembly of claim 11, wherein the at least one positioning hole of the second positioning piece is made by punching.

15. The hinge assembly of claim 11, wherein a restricting protrusion is formed on the first supporting member; an arched restricting groove is defined in the second supporting member; the restricting protrusion is slidably received in the arched restricting groove.

16. The hinge assembly of claim 11, wherein the hinge assembly further comprises a friction member sleeved on the pivot shaft, and the friction member fixed to the first supporting member.

17. The hinge assembly of claim 11, wherein the hinge assembly further comprises a fastening member engaging with an end of the pivot shaft.

18. The hinge assembly of claim 17, wherein a threaded portion is formed on an end of the pivot shaft, the fastening member is a nut engaging with the threaded portion of the pivot shaft.

19. The hinge assembly of claim 17, wherein the hinge assembly further comprises a flat washer sleeved on the pivot shaft, and positioned between the fastening member and the second supporting member.

* * * * *